US008561742B2

(12) United States Patent
Pedret et al.

(10) Patent No.: US 8,561,742 B2
(45) Date of Patent: Oct. 22, 2013

(54) INSERT, PLASTIC PART ASSEMBLY UTILIZING SAME AND DIE-CASTING MOLD FOR MAKING THE INSERT

(75) Inventors: Montserrat Pinol Pedret, Tarragona (ES); Ramon Aguila Caceres, Tarragona (ES)

(73) Assignee: Lear Corporation, Southfield, MI (US)

( * ) Notice: Subject to any disclaimer, the term of this patent is extended or adjusted under 35 U.S.C. 154(b) by 1229 days.

(21) Appl. No.: 11/538,972

(22) Filed: Oct. 5, 2006

(65) Prior Publication Data

US 2008/0083574 A1    Apr. 10, 2008

(51) Int. Cl.
*B60R 16/04* (2006.01)

(52) U.S. Cl.
USPC ........................................................ 180/68.5

(58) Field of Classification Search
USPC ................. 180/68.5; 411/82, 82.1, 180, 446, 411/451.1, 452, 451.2, 451.3
See application file for complete search history.

(56) References Cited

U.S. PATENT DOCUMENTS

| | | | |
|---|---|---|---|
| 4,016,918 A | 4/1977 | Thacker | |
| 4,254,986 A | 3/1981 | Nakamura | |
| 4,322,105 A | 3/1982 | Onda | |
| 4,731,707 A | 3/1988 | McMahan et al. | |
| 4,842,462 A * | 6/1989 | Tildesley | 411/180 |
| 4,846,612 A * | 7/1989 | Worthing | 411/82.1 |
| 5,269,640 A | 12/1993 | Jonishi et al. | |
| 5,445,483 A * | 8/1995 | Fultz | 411/181 |
| 5,620,057 A * | 4/1997 | Klemen et al. | 180/68.5 |
| 5,702,144 A | 12/1997 | Matsuura et al. | |
| 5,806,619 A | 9/1998 | Kleinhoffer et al. | |
| 6,406,087 B2 | 6/2002 | Sawayanagi | |
| 6,428,077 B1 | 8/2002 | Sawayanagi | |
| 6,692,207 B1 * | 2/2004 | Bailey | 411/180 |
| 7,083,207 B2 | 8/2006 | Matsuzawa | |
| 7,097,403 B1 * | 8/2006 | Seace | 411/287 |
| 7,195,436 B1 * | 3/2007 | Stephen | 411/82.1 |
| 2004/0136812 A1 | 7/2004 | Kawai et al. | |

* cited by examiner

*Primary Examiner* — Katy M Ebner
(74) *Attorney, Agent, or Firm* — Brooks Kushman P.C.

(57) ABSTRACT

A molded metal insert and plastic part integrally formed therewith form an assembly wherein the insert is provided with anti-rotation, die-cast teeth. The insert is adapted to attach and fix the plastic part to a vehicle structure in combination with a threaded fastener. The insert includes a cylindrical metal body having inner and outer diameters and upper and lower end portions. The inner diameter defines a passageway sized to allow an externally threaded portion of the fastener to extend through the passage and below the lower end portion for threaded attachment to the vehicle structure. The upper end portion provides a seat for a head of the fastener. The anti-rotation metal teeth are integrally molded with and extend radially outwardly from the cylindrical metal body between the inner and outer diameters and between the upper and lower end portions wherein the upper and lower end portions protect the teeth. A die-casting mold for forming the insert is also provided.

20 Claims, 3 Drawing Sheets

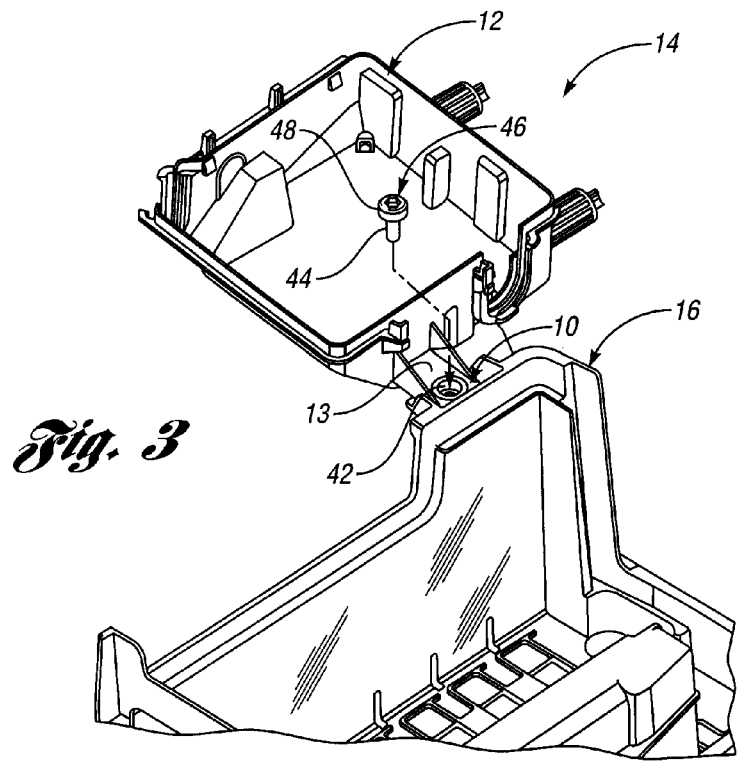
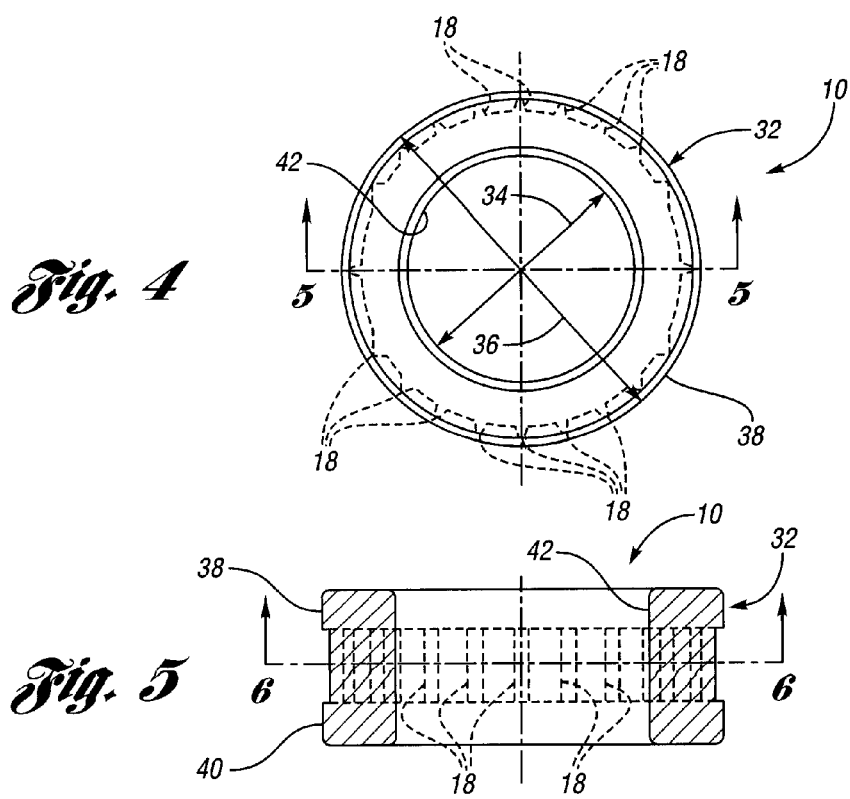

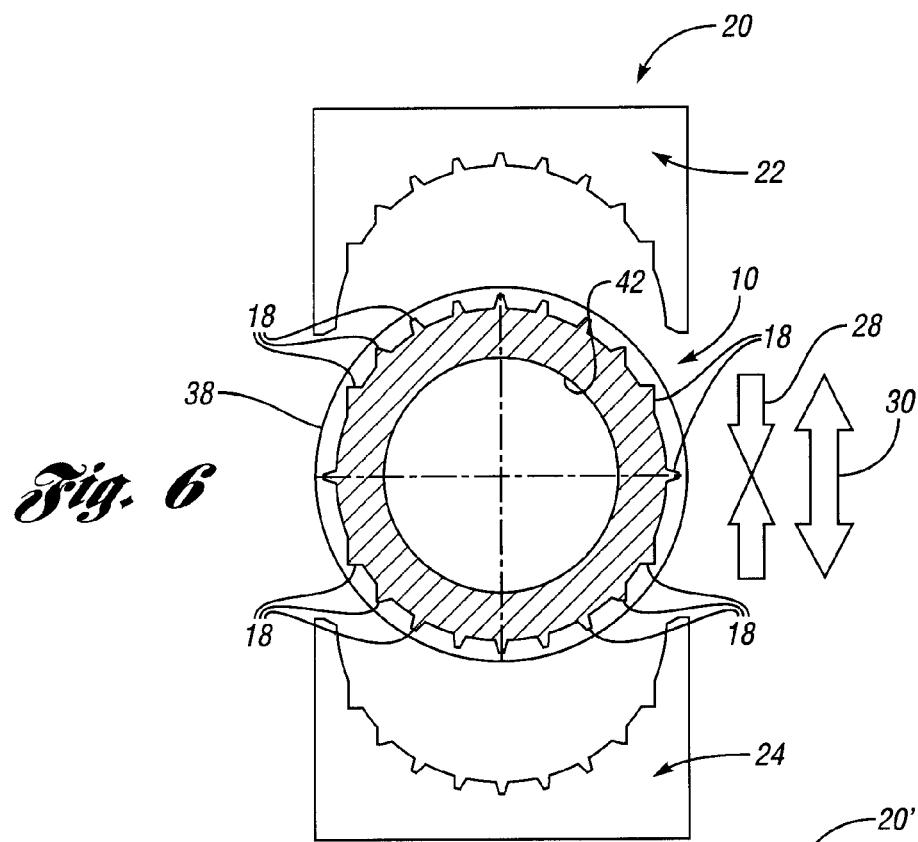
*Fig. 6*
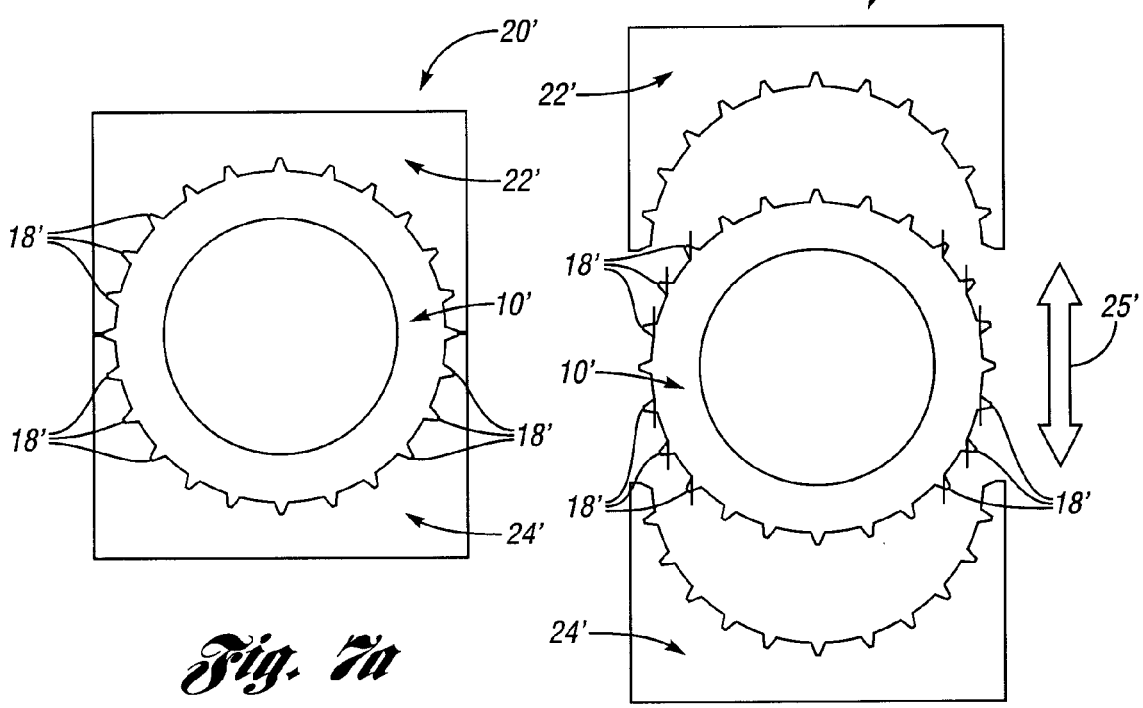
*Fig. 7a*
*Fig. 7b*

INSERT, PLASTIC PART ASSEMBLY UTILIZING SAME AND DIE-CASTING MOLD FOR MAKING THE INSERT

CROSS-REFERENCE TO RELATED APPLICATIONS

This application is related to U.S. patent application entitled "Junction Box Assembly" filed on the same day as this application and having U.S. Ser. No. 11/538,929, which issued as U.S. 7,459,630.

BACKGROUND OF THE INVENTION

1. Field of the Invention

This invention is related to a molded metal inserts, plastic part assemblies utilizing such inserts and die-casting molds for making same inserts. The present invention may be applied to a plastic electrical box (i.e., junction box, electronic box) or plastic housing that requires a robust attachment to a vehicle structure.

2. Background Art

Electric boxes utilized in automotive vehicles, such as junction electronic boxes which have a plastic housing, need to be fixed to such vehicles, normally with screws. For this reason, the boxes must have some external elements like "ears" or flanges, that is, flat parts with a hole in them, so that a screw is inserted through them and screwed in the frame or other structure of the car (thus providing the fixation or attachment of the box).

Normally, the electric box housings are made of plastic, and that means that such "ears" are also made from plastic (in the same injection mold process). Nevertheless, although a "well designed" plastic "ear" is enough to ensure robustness for such attachment, all plastic materials under pressure, (here from the attachment screw), suffer some deformation or "narrowing" with aging. This "narrowing" causes the screw to become loose or, what, in turn, causes the box to become loose.

For this reason, a metal ring is often put between the plastic "ear" and the screw, to provide a non-deformation feature when the screw is fixed to the frame or structure of the car. In this way, the electronic box can withstand the vibration and robustness required by car manufacturers.

If one considers minimum cost and high reliability of the assembly, then the result is that this metal element is inserted during the molding process of the housing. There is a well known method to put metal elements inside the mold wherein molten plastic material is injected to get the corresponding plastic part assembly. With this process, one can avoid later manual location of the metal element, ensure that the metal element will not separate from the plastic part and, furthermore, that all "ears" will have "automatically" its respective metal element. That means high reliability and quality of the result.

However, a round metal ring molded with its plastic part may "rotate" when the screw is screwed into the vehicle's frame. This often produces undesired scratches in the plastic, or the metal ring can come loose if the part is disassembled. As this is not acceptable in the automotive market, some anti-rotation means or mechanism is desired.

A relatively easy solution to this problem is to make the metal ring non-round or oval, as this shape provides both anti-rotation and adjustment to tolerances of the holes in the frame of the car where the box is to be attached. Oval-shaped holes may be required to adjust to the tolerance in the position of the nuts welded in the vehicle frame. Normally, tolerance can be defined only in one "diameter" of the hole and, then, the oval shape is in this orientation. However, because of the positioning process for the box, sometimes there must be tolerance in two perpendicular "diameters" of the hole. Then there is no better solution than a bigger round hole. However, present day requirements from customers require high screwing forces, and that the metal piece or ring not rotate in the plastic hole of the box.

Another possible solution is to machine the round element in its lateral wall to make some "teeth" that, after filled by the injected plastic, would ensure such anti-rotation robustness. However, this is a quite expensive solution.

The following U.S. patent references are related to the present invention: U.S. Pat. Nos. 7,083,207; 6,428,077; 6,406,087; 5,806,619; 5,702,144; 5,269,640; 4,731,707; 4,322,105; 4,254,986; 4,016,918; and 2004/0136812.

SUMMARY OF THE INVENTION

An object of the present invention is to provide a molded metal insert, a plastic part assembly utilizing the insert, and a die-casting mold for making such an insert, wherein the insert includes anti-rotation metal "teeth" which are molded in a cheap and simple die-cast process and mold. The "teeth" sides are oriented or shaped in a way that the inserts can be molded in a single die-cast, two-part mold.

In carrying out the above object and other objects of the present invention, a molded metal insert adapted to attach and fix a plastic part to a vehicle structure is provided. The insert includes a cylindrical metal body having inner and outer diameters and upper and lower end portions. The inner diameter defines a passageway sized to allow a threaded portion of a fastener to extend through the passage and below the lower end portion for threaded attachment to the vehicle structure. The upper end portion provides a seat for a head of the fastener. A plurality of anti-rotation metal teeth are integrally molded with and extend radially outwardly from the cylindrical metal body between the inner and outer diameters and between the upper and lower end portions.

The teeth may be sized and shaped to permit the insert to be die cast in a two-part mold without breaking the teeth during opening of the mold.

The teeth may not radially extend beyond the outer diameter so that the upper and lower end portions protect the teeth.

The teeth may extend the entire distance between the upper and lower end portions of the metal body.

The plastic part may comprise a plastic housing having a plastic flange to receive and retain the insert at the teeth between the upper and lower end portions.

The plastic housing may comprise an electric box housing.

The vehicle structure may comprise a battery support located within an engine compartment of the vehicle.

Further in carrying out the above object and other objects of the present invention, a molding assembly for attachment to a vehicle structure is provided. The assembly includes a plastic part and a metal insert integrally formed with the metal part. The insert includes a cylindrical metal body having inner and outer diameters and upper and lower end portions. The inner diameter defines a passageway sized to allow a threaded portion of a fastener to extend through the passageway and below the lower end portion for threaded attachment to the vehicle structure. The upper end portion provides a seat for a head of the fastener. A plurality of anti-rotation metal teeth are integrally molded with and extend radially outwardly from the cylindrical metal body between the inner and outer diameters and between the upper and lower end portions.

The teeth may be sized and shaped to permit the insert to be die cast in a two-part mold without breaking the teeth during opening of the mold.

The teeth may not radially extend beyond the outer diameter so that the upper and lower end portions protect the teeth.

The teeth may extend the entire distance between the upper and lower end portions of the vehicle body.

The plastic part may comprise a plastic housing having a plastic flange to receive and retain the insert at the teeth between the upper and lower end portions.

The plastic housing may comprise an electric box housing.

The vehicle structure may comprise a battery support located within an engine compartment of the vehicle.

Still further, for carrying out the above object and other objects of the present invention, a die-casting mold for making the insert is provided.

The above object and other objects, features, and advantages of the present invention are readily apparent from the following detailed description of the best mode for carrying out the invention when taken in connection with the accompanying drawings.

BRIEF DESCRIPTION OF THE DRAWINGS

FIG. 3 is a view similar to the view of FIG. 2 with the plastic housing assembly aligned with the battery support so that a threaded fastener can be inserted into a passageway of the insert and threaded into a nut fixedly secured to the battery support;

FIG. 4 is a top plan view of the insert of FIG. 1;

FIG. 5 is a sectional view of the insert taken along lines 5-5 of FIG. 4;

FIG. 6 is a sectional view of the insert of FIG. 1 taken along lines 6-6 of FIG. 5 within a die-casting mold constructed in accordance with one embodiment of the present invention, the mold being in its open position;

FIG. 7a is a side schematic view of a die-casting mold in its closed position for making an insert having a "regular" tooth distribution and shape; and FIG. 7b is a view of the mold of FIG. 7a in its open position wherein short vertical lines mark teeth which are broken during the opening of the mold.

DETAILED DESCRIPTION OF THE PREFERRED EMBODIMENT(S)

Figure 1:
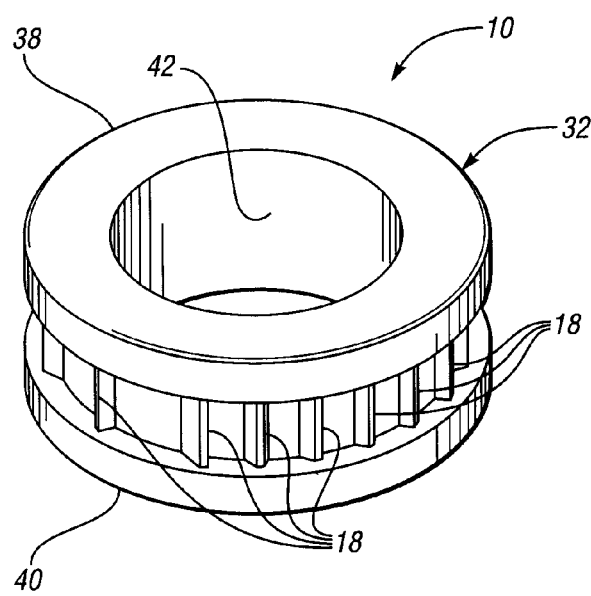
FIG. 1 is a perspective schematic view of a molded metal insert constructed in accordance with one embodiment of the present invention.

In general, one embodiment of the present invention provides a molded metal insert, generally indicated at 10 in FIG. 1, and a plastic part, such as a plastic housing generally indicated at 12, of an electric box, integrally formed with the insert 10 to form an assembly, generally indicated at 14, which, in turn, is attached and fixed to a vehicle structure such as a battery support, generally indicated at 16. The insert or grommet 10 includes teeth 18 to prevent rotation of the insert 10 relative to the plastic part 12. The teeth 18 are sized and shaped in a way that simple die-casting of the insert 10 is possible. A die-casting die or mold constructed in accordance with one embodiment of the invention is generally indicated at 20 in FIG. 6, and has only two parts 22 and 24 which define an article-defining cavity for forming the insert 10. Movement of the parts or mold halves 22 and 24 is indicated by the vertical lines 26 and arrows 28 and 30 in FIG. 6. The teeth 18 are shaped so as not to impede the opening of two parts 22 and 24 of the die 20 after the insert 10 has been cast. As is commonly known, a hole or passageway 42 in the insert 10 is made by a very simple sliding element, (small cylinder), separate from the halves 22 and 24 of the mold 10.

FIGS. 7c and 7b illustrate a die-casting process for an insert 10' having a regular tooth distribution and shape. The process utilizes a mold 20' having mold halves 22' and 24'. However, as illustrated in FIG. 7b, when the mold halves 22' and 24' are moved in the direction of arrows 25', teeth 18' are broken as indicated by the short vertical lines.

The insert 10 comprises a cylindrical metal body, generally indicated at 32, having inner and outer diameters 34 and 36, respectively (in FIG. 4), and upper and lower end portions 38 and 40, respectively. The inner diameter 34 defines the passageway 42 which is sized to allow an externally threaded portion 44 of a fastener, generally indicated at 46 in FIG. 3, to extend through the passage 42 and below the lower end portion 40 for threaded attachment to a nut 47 welded to the battery support 16 (i.e., FIG. 2). The upper end portion 38 provides a seat for a head 47 of the fastener 46.

The anti-rotation metal teeth 18 are integrally molded with and radially extend from the cylindrical metal body 32 between the inner and outer diameters 34 and 36, respectively, and between the upper and lower end portions 38 and 40, respectively, wherein the upper and lower end portions 38 and 40, respectively, protect the teeth 18 as illustrated in FIGS. 4 and 5.

The teeth 18 are shaped to permit the insert 10 to be die cast in the two-part mold 20 without breaking the teeth 18 during opening of the mold 20 as previously mentioned and as illustrated in FIG. 6.

Figure 2:
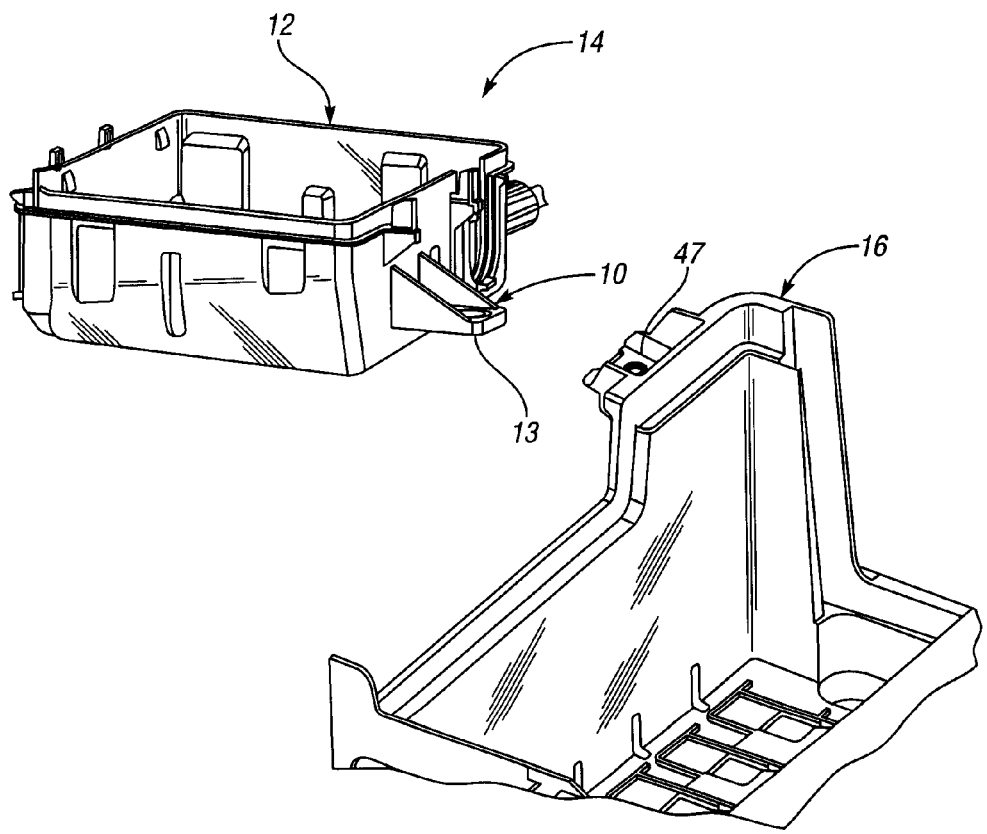
FIG. 2 is a perspective schematic view, partially broken away, of a plastic housing assembly constructed in accordance with one embodiment of the present invention and a battery support located within the engine compartment of a motor vehicle prior to attachment and fixing of the two parts together.

The plastic housing 12 has a plastic flange 13 to receive and retain the insert 10 at the teeth 18 between the upper and lower end portions 38 and 40, respectively, as illustrated in FIGS. 2 and 3.

The battery support 16 is typically located within an engine compartment of the vehicle.

While the material of the insert 10 is preferably ZAMAK-5, a zinc die-casting alloy commercially available from a number of different sources, the material is typically selected according to customer requirements from the available metal alloys for die-casting parts. The finishing of the insert 10 is preferably a 6-10 micron chrome layer which is also subject to customer requirements.

The end portions 38 and 40 of the insert 10 act like fixed "washers" and add protection to the teeth 18 while in the assembly process, (i.e., moving and robot handling). Also, the end portions 38 and 40 counteract vertical forces experienced by the insert 10. Injected plastic will create an external ring, (between the two fixed "washers" 38 and 40), to help prevent the insert 10 from leaving the plastic part 12.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A molded metal insert adapted to attach and fix a plastic part to a vehicle structure, the insert comprising:

a cylindrical molded metal body having inner and outer diameters and upper and lower molded end portions, the upper and lower end portions collectively defining the outer diameter, each end portion being continuous about a circular periphery, the inner diameter defining a passageway sized to allow a threaded portion of a fastener to extend through the passageway and below the lower end portion for threaded attachment to the vehicle structure, the upper end portion providing a seat for a head of the fastener; and a plurality of anti-rotation metal teeth integrally molded with and extending radially outwardly from the cylindrical metal body between the inner and outer diameters and integrally molded with and extending linearly between the upper and lower end portions wherein the insert has an irregular tooth distribution and the teeth are sized and sides of the teeth are oriented or shaped to permit the insert to be die cast in a cavity formed between first and second parts meeting at a plane of a two-part mold without breaking the teeth during movement of the first part in a first direction perpendicular to the plane and movement of the second part in a second direction opposite the first direction perpendicular to the plane during opening of the mold and wherein each tooth adjacent to but spaced from the plane has first and second side surfaces wherein each of the first side surfaces is substantially perpendicular to the plane so that none of the adjacent teeth break during opening of the mold and wherein each of the teeth extends linearly in a direction perpendicular to the first and second directions the entire distance between the upper and lower portions of the metal body.

2. The insert as claimed in claim 1, wherein the teeth do not radially extend beyond the outer diameter and wherein the upper and lower end portions protect the teeth.

3. The insert as claimed in claim 1, wherein the plastic part comprises a plastic housing having a plastic flange to receive and retain the insert at the teeth between the upper and lower end portions.

4. The insert as claimed in claim 3, wherein the plastic housing comprises an electric box housing.

5. The insert as claimed in claim 1, wherein the vehicle structure comprises a battery support located within an engine compartment of the vehicle.

6. A die-casting mold for making the molded metal insert of claim 1.

7. The mold as claimed in claim 6, wherein the mold is a two-part mold and the wherein the teeth are sized and shaped to permit the insert to be die cast in the mold without breaking the teeth during opening of the mold.

8. The mold as claimed in claim 6, wherein the teeth do not radially extend beyond the outer diameter so that the upper and lower portions protect the teeth.

9. A molding assembly for attachment to a vehicle structure, the assembly comprising:

a plastic part, and a metal insert integrally formed with the plastic part, the insert including:

a cylindrical molded metal body having a circular cross-section with inner and outer diameters and upper and lower molded end portions, each end portion being continuous about a circular periphery, the inner diameter defining a passageway sized to allow a threaded portion of a fastener to extend through the passageway and below the lower end portion for threaded attachment to the vehicle structure, the upper end portion providing a seat for a head of the fastener; and a plurality of anti-rotation metal teeth integrally molded with and extending radially outwardly from the cylindrical metal body between the inner and outer diameters and integrally molded with and extending linearly between the upper and lower end portions wherein the insert has an irregular tooth distribution and the teeth are sized and the sides of the teeth are oriented or shaped to permit the insert to be die cast in a cavity formed between first and second parts meeting at a plane of a two-part mold without breaking the teeth during movement of the first part in a first direction perpendicular to the plane and movement of a second part in a second direction opposite the first direction and perpendicular to the plane during opening of the mold and wherein an array of non-symmetrical first teeth formed adjacent to but spaced from the plane, each first tooth having first and second side surfaces wherein each of the first side surfaces is substantially perpendicular to the plane so that none of the adjacent teeth break during opening of the mold and wherein each of the teeth extends linearly in a direction perpendicular to the first and second directions the entire distance between the upper and lower portions of the metal body.

10. The assembly as claimed in claim 9, wherein the teeth do not radially extend beyond the outer diameter and wherein the upper and lower end portions protect the teeth.

11. The assembly as claimed in claim 9, wherein the plastic part comprises a plastic housing having a plastic flange to receive and retain the insert at the teeth between the upper and lower end portions.

12. The assembly as claimed in claim 11, wherein the plastic housing comprises an electric box housing.

13. The assembly as claimed in claim 9, wherein the vehicle structure comprises a battery support located within an engine compartment of the vehicle.

14. The assembly as claimed in claim 9, wherein the teeth further comprise an array of non-symmetrical second teeth formed adjacent to but spaced from the first teeth, each second tooth having a first side surface that is generally parallel to and offset inward from the first side surface of an adjacent first tooth.

15. The assembly as claimed in claim 14, wherein the teeth are disposed along a complete circumference of the body.

16. The assembly as claimed in claim 9, wherein the teeth further comprise a pair of symmetrical planar teeth oriented diametrically opposite from each other and along the plane.

17. The assembly as claimed in claim 16, wherein the plane bisects the body at the planar teeth into a pair of symmetrical body halves.

18. The assembly as claimed in claim 16, wherein the teeth further comprise a pair of transverse teeth oriented diametrically opposite from each other and transversely oriented relative to the planar teeth, such that the planar teeth and the transverse teeth collectively divide a circular cross-section of the body into four quadrants.

19. The assembly as claimed in claim 18, wherein each quadrant of the body includes one of the first teeth.

20. The assembly as claimed in claim 19, wherein the teeth further comprise an array of non-symmetrical second teeth formed adjacent to but spaced from the first teeth, each second tooth having a first side surface that is generally parallel to the first side surface of an adjacent first tooth and offset toward the transverse teeth.

* * * * *